(12) United States Patent
Eckstein

(10) Patent No.: US 9,975,419 B2
(45) Date of Patent: May 22, 2018

(54) AIR DAM ASSEMBLY FOR A VEHICLE

(71) Applicant: GM GLOBAL TECHNOLOGY OPERATIONS LLC, Detroit, MI (US)

(72) Inventor: Joseph N. Eckstein, Saint Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 15/158,628

(22) Filed: May 19, 2016

(65) Prior Publication Data
US 2017/0334282 A1    Nov. 23, 2017

(51) Int. Cl.
*B60K 11/02* (2006.01)
*B62D 35/00* (2006.01)

(52) U.S. Cl.
CPC ........... *B60K 11/02* (2013.01); *B62D 35/005* (2013.01)

(58) Field of Classification Search
None
See application file for complete search history.

(56) References Cited

U.S. PATENT DOCUMENTS

| 7,686,383 | B2 * | 3/2010 | Tortosa-Boonacker | B62D 35/005 296/180.1 |
| 2010/0052361 | A1 * | 3/2010 | Tortosa-Boonacker | B62D 35/005 296/180.1 |
| 2010/0219661 | A1 * | 9/2010 | Butlin, Jr. | B62D 35/005 296/180.1 |

* cited by examiner

*Primary Examiner* — John D Walters
*Assistant Examiner* — Hilary L Johns
(74) *Attorney, Agent, or Firm* — Quinn IP Law

(57) ABSTRACT

A vehicle includes an air dam assembly disposed at a first end of the vehicle body that is configured to control an airflow between the vehicle body and a road surface from outside the vehicle to the under-hood compartment of the vehicle. The air dam assembly includes a housing having a top wall and a bottom wall defining a forward wall and an opposing rearward wall therebetween. A plurality of flexible pleats are disposed on the forward wall of the of the air dam housing.

19 Claims, 3 Drawing Sheets

AIR DAM ASSEMBLY FOR A VEHICLE

TECHNICAL FIELD

This disclosure relates to an air dam assembly for a motor vehicle.

BACKGROUND

Motor vehicles frequently employ ambient airflow for cooling powertrain components situated in an under-hood compartment. Ambient airflow typically enters the under-hood compartment through a grille opening strategically positioned in a high pressure area on the vehicle body or from underneath the vehicle body. A motor vehicle may also employ a front spoiler or air dam to control the amount of ambient airflow thus entering the under-hood compartment.

It is known that the aerodynamic characteristics of vehicles can be improved by an air dam mounted underneath the front bumper of the car and extending into proximity with the roadway. An air dam may also be employed to control flow of air relative to the vehicle at speed to enhance vehicle dynamics and handling, as well as improve drag coefficient of the vehicle body, or generate down-force thereon.

Such an air dam is typically positioned under or integrated with the vehicle's front bumper. In order for an air dam to perform its function, however, the subject air dam may be positioned sufficiently low for some obstacles and obstructions found on road ways to interfere with the air dam and cause damage thereto.

SUMMARY

A vehicle includes an air dam assembly disposed at a first end of a vehicle body that is configured to control an airflow between the vehicle body and a road surface from outside the vehicle to the under-hood compartment of the vehicle. The vehicle includes a vehicle body having a first end and a second end. A hood is configured to cover a portion of the first end of the body to thereby define an under-hood compartment. The air dam assembly includes an air dam housing having a top wall and a bottom wall defining a forward wall and an opposing rearward wall therebetween. A plurality of flexible pleats are disposed on the air dam housing.

The plurality of flexible pleats include a plurality of pleat bodies each having an upper portion and an opposing lower portion. The plurality of pleat bodies define a plurality of leading and trailing edges extending between the upper and lower portions of the pleat bodies. In one embodiment of the disclosure, the plurality of flexible pleats may be integrally formed into the air dam housing. Alternatively, the plurality of flexible pleats may be secured to the forward wall of the air dam housing. The plurality of flexible pleats are disposed on the air dam housing in a generally vertical arrangement.

The pleat body of the plurality of flexible pleats of the air dam assembly may include a curved surface extending inward relative to the air dam housing between the upper portion and lower portion of the pleat body. Alternatively, the pleat body is a generally planar surface extending between the upper portion and lower portion of the pleat body.

The air dam housing of the air dam assembly includes a curved surface configured to at least partially wrap around the first end of the body and to align with the vehicle body. In one embodiment of the disclosure, the air dam housing is disposed and extends between the left and right sides of the vehicle body. The plurality of flexible pleats are disposed on portions of the forward wall of the air dam housing proximate the left and right sides of the vehicle body.

The under-hood compartment of the vehicle may house an internal combustion engine and a heat exchanger such that the engine is cooled by a fluid circulating through the heat exchanger. The air dam assembly directs the airflow such that the airflow is passed through the heat exchanger to modulate cooling the fluid after the fluid is passed through the engine.

In another embodiment of the disclosure, a vehicle includes a vehicle body having a first end and a second end. A hood is configured to cover a portion of the first end of the body to thereby define an under-hood compartment housing an internal combustion engine and a heat exchanger. An air dam assembly is disposed on the first end of a vehicle body that is configured to control an airflow between the vehicle body and a road surface from outside the vehicle to the under-hood compartment of the vehicle.

The air dam assembly includes an air dam housing having a curved surface configured to at least partially wrap around the first end of the body and to align with the vehicle body and is defined by a top wall and a bottom wall defining a forward wall and an opposing rearward wall therebetween. A plurality of flexible pleats are disposed on the forward wall of the housing in a generally vertical arrangement. The engine of the vehicle is cooled by a fluid circulating through the heat exchanger and the air dam assembly directs the airflow such that the airflow is passed through the heat exchanger to modulate cooling the fluid after the fluid is passed through the engine.

The plurality of flexible pleats further comprise a plurality of pleat bodies having an upper portion and an opposing lower portion, wherein the plurality of pleat bodies define a plurality of leading and trailing edges extending between the upper and lower portions of the pleat bodies. In another embodiment of the disclosure, the plurality of flexible pleats are integrally formed into the air dam housing. Alternatively, the plurality of flexible pleats are secured to the forward wall of the air dam housing. The pleat body may include a curved surface extending inward relative to the air dam housing between the upper portion and lower portion. Alternatively, the pleat body is a generally planar surface extending between the upper portion and lower portion.

In yet another embodiment of the disclosure, an air dam assembly for a vehicle is disclosed. The air dam assembly includes is defined by a top wall and a bottom wall defining a forward wall and an opposing rearward wall therebetween. A plurality of flexible pleats is disposed on the air dam housing in a generally vertical arrangement.

The plurality of flexible pleats further comprise a plurality of pleat bodies having an upper portion and an opposing lower portion, wherein the plurality of pleat bodies define a plurality of leading and trailing edges extending between the upper and lower portions of the pleat bodies. In another embodiment of the disclosure, the plurality of flexible pleats are integrally formed into the air dam housing. The pleat body may include a curved surface extending inward relative to the air dam housing between the upper portion and lower portion.

The above features and advantages, and other features and advantages of the present disclosure, will be readily apparent from the following detailed description of the embodiment(s) and best mode(s) for carrying out this disclosure when taken in connection with the accompanying drawings and appended claims.

DETAILED DESCRIPTION

Figure 1:
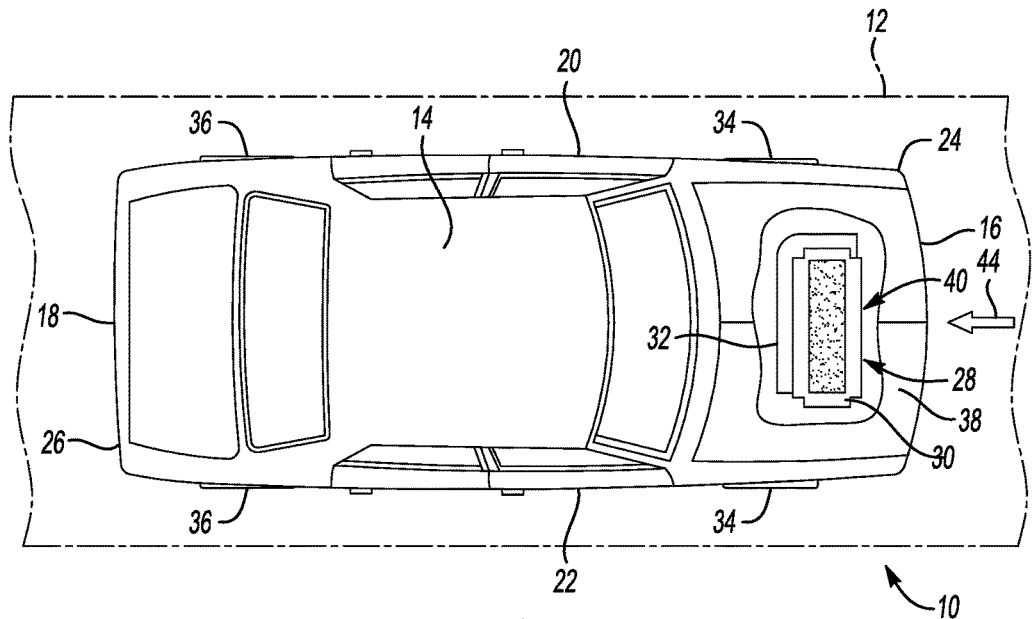
FIG. 1 is a schematic top view of a vehicle including an air dam assembly disposed at an entrance to an under-hood compartment.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, FIG. 1 shows a schematic view of a motor vehicle 10 positioned relative to a road surface 12. The vehicle includes a vehicle body 14. The vehicle body 14 defines four body sides. The four body sides include a first or front end 16, a second or rear end 18, a left side 20, and a right side 22. As shown, the first end 16 may include a bumper assembly 24, while the second end 18 may include a bumper assembly 26.

The vehicle 10 also includes a powertrain 28 configured to propel the vehicle. As shown in FIG. 1, the powertrain 28 may include an internal combustion (IC) engine 30 and a transmission 32. The powertrain may include any suitable internal combustion engine capable of transforming hydrocarbon fuel to mechanical power to generate torque in response to commands originating from the control system. Alternatively, the powertrain may include as an electric machine or other device operable for generating output torque, including, but not limited to, one or more motors or generators or fuel cells, neither of which are shown, but a powertrain configuration employing such devices is appreciated by those skilled in the art.

The vehicle 10 also includes a plurality of wheels 34 and 36. Depending on specific configuration of the powertrain 28, power of the engine 30 may be transmitted to the road surface 12 through the wheels 34, the wheels 36, or through all the wheels 34 and 36. The vehicle, for illustrative purposes, may constitute a motor vehicle. However, it is understood that the vehicle may be any mobile platform, such as an airplane, all-terrain vehicle (ATV), boat, personal movement device, robot and the like to accomplish the purposes of this disclosure.

As also shown in FIG. 1, the vehicle body 14 includes a hood 38 configured to cover a portion of the first end 16 of the body to thereby define an under-hood compartment 40. The under-hood compartment 40 may be configured to receive and support or house the internal combustion engine 30 and a heat exchanger. In one embodiment of the disclosure, the engine 30 is cooled by a fluid circulating through the heat exchanger.

Figure 2:
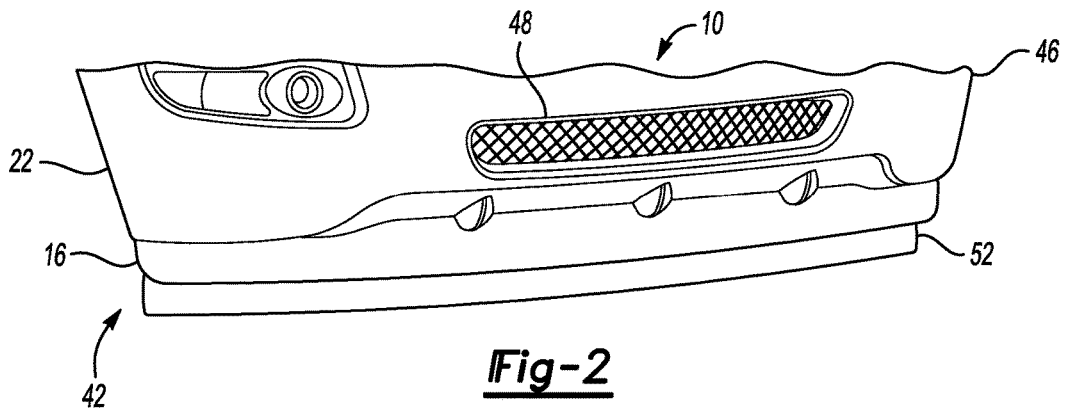
FIG. 2 is a perspective view of a portion of a front end of the vehicle incorporating the air dam assembly.

Referring additionally to FIG. 2, the first end 16 of vehicle 10 may include one or more of a front fascia 46, a grille 48 and headlights. Below the front fascia 46 is an air dam assembly 42 having a housing 52 which is not movable relative to the vehicle 10 during vehicle operation. It is also contemplated that the air dam housing 52 may be adjustably positioned relative to the vehicle body as is known in the art. It is also contemplated that the air dam assembly may be disposed on other parts of the vehicle, including, but not limited to, a second or rear end of the vehicle or adjacent one or more wheel wells provided in the vehicle body to accomplish the objectives of the disclosure.

Air dam assembly 42 is disposed at the front end 16 and configured to control an airflow 44 from outside the vehicle, such as the ambient airflow to the under-hood compartment 40 in order to provide cooling for the powertrain 28. As will be described in greater detail below, the air dam assembly 42 directs the airflow 44 such that the airflow 44 is passed through the heat exchanger to modulate cooling the fluid after the fluid is passed through the engine 30.

As shown in Figures, the air dam assembly 42 is positioned beneath the bumper assembly 24, such that the air dam assembly 42 may be positioned into the path of the airflow 44 between the first end 16 of the body and the road surface 12 traveling toward the under-hood compartment 40 of the vehicle 10. It is contemplated that the air dam housing 52 of air dam assembly 42 may be supported by the front fascia 46 or any other suitable vehicle structure near the first end 16 of the vehicle 10.

Figure 3:
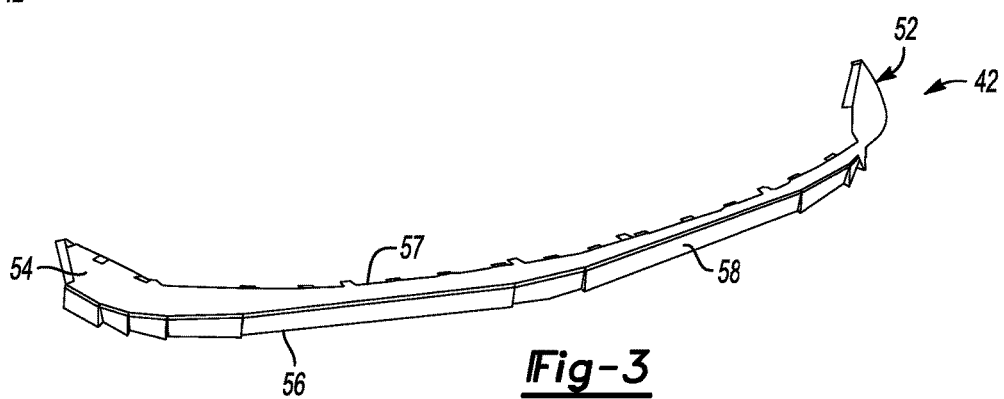
FIG. 3 is a perspective view of the air dam assembly in accordance with the present disclosure.

Referring now to FIG. 3, the air dam housing 52 of air dam assembly 42 includes a top wall 54 that is generally planar and may be secured to the underside of the front fascia or vehicle body (not shown) and an opposing bottom wall 56. The air dam housing 56 may be secured to the vehicle body (not shown) by a fastening mechanism, such as a mechanical fastener, adhesive fastener or the like as is known in the art. In one embodiment of the disclosure, the overall shape of the air dam housing 52 of the air dam assembly 42 includes a curved surface configured to at least partially wrap around the first end of the vehicle body when viewed from above such that the shape of the air dam housing 52 aligns with the contours of the vehicle body. It is also understood that the air dam housing may be formed with other geometries while still accomplishing the objectives of this disclosure.

Figure 4:
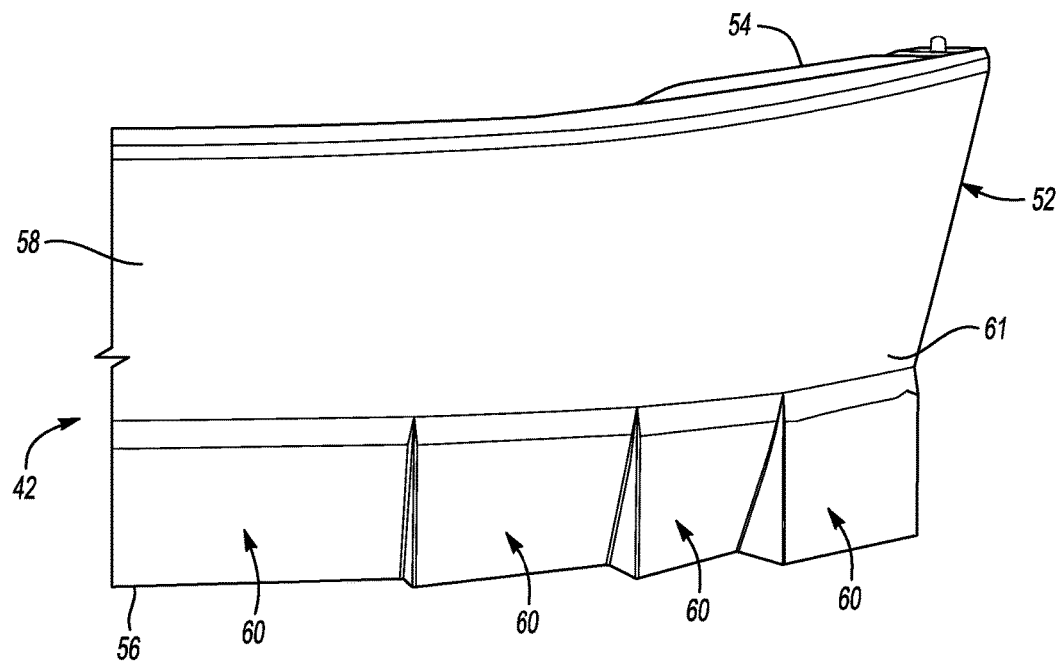
FIG. 4 is a perspective view of a forward wall of an air dam housing incorporating a plurality of flexible pleats in accordance with the present disclosure.

As is best shown in FIG. 4, a forward wall 58 and an opposing rearward wall 57 are defined by and extend between the top wall 54 and bottom wall 56 of the air dam housing 52. A plurality of flexible pleats 60 are disposed on at least one portion of the forward wall 58. The arrangement and geometry of the plurality of flexible pleats 60 may be positioned in such a way that the pleats 60 may allow non-linear displacement of the pleats 60 to fold or collapse into the air dam assembly housing in response to contact with objects such as curbs and the like.

Figure 5:
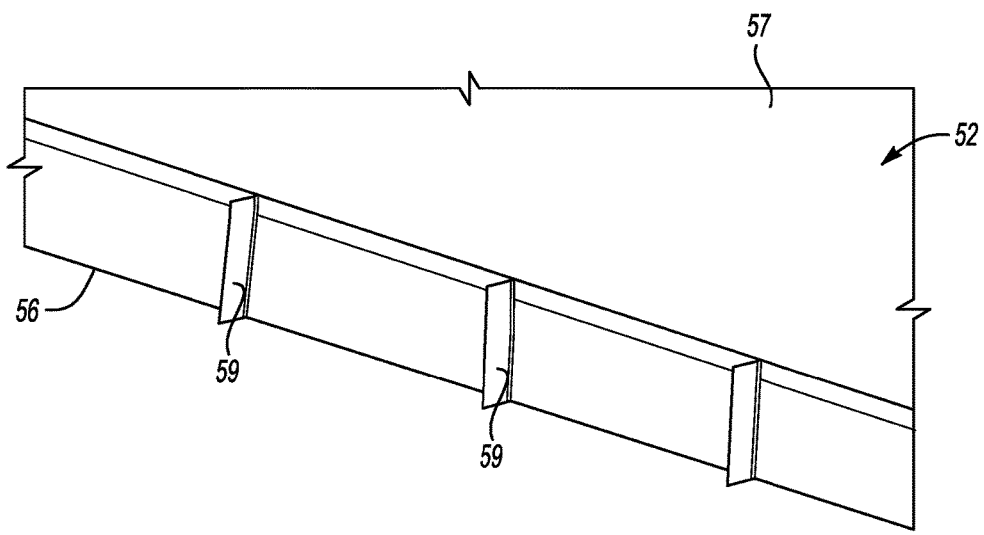
FIG. 5 is a perspective view of a rearward wall of an air dam housing incorporating a plurality of fins in accordance with the present disclosure.

Referring additionally to FIG. 5, a rearward wall 57 of the air dam housing 52 may include one or more fins 59 that may be formed into or secured on the rearward wall 57 adjacent the bottom wall 56 of the housing 52. The fins 59 may be secured to the rearward wall 57 by a fastening mechanism, such as a mechanical fastener, adhesive fastener or the like as is known in the art. Fins 59 provide supplemental structural strength and initial stiffness to the housing 52. It is contemplated that the plurality of pleats 60 may be disposed on the air dam housing 52 proximate to areas of curvature in the housing 52 to provide additional structural compliance in response to contact with curbs and other ground level surface features while maintaining initial stiffness to vehicle events such as wind loading. Further, the one or more fins 59 may cooperate with the plurality of pleats 60 to provide initial stiffness to the housing 52 to resist wind loads and compliant behavior, such as collapsing.

In one embodiment of the disclosure, the plurality of flexible pleats 60 may be integrally formed in a portion of the forward wall 58 of the air dam housing 52 generally proximate the bottom wall 56 of housing 52. The plurality of flexible pleats 60 may be integrally formed into the forward wall 58 below a support section 61 formed in the air dam housing 52. It is contemplated that support section 61 may be formed into the air dam housing with a reduced thickness relative to the remainder of the air dam housing 52 to allow the support section to be flexible similar to a living hinge arrangement as is known in the art. Alternatively, the plurality of flexible pleats 60 may be secured to the forward wall 58 of the air dam housing 52. The pleats 60 may be secured to the forward wall 58 by a fastening mechanism, such as a mechanical fastener, adhesive fastener or the like as is known in the art.

Figure 6:
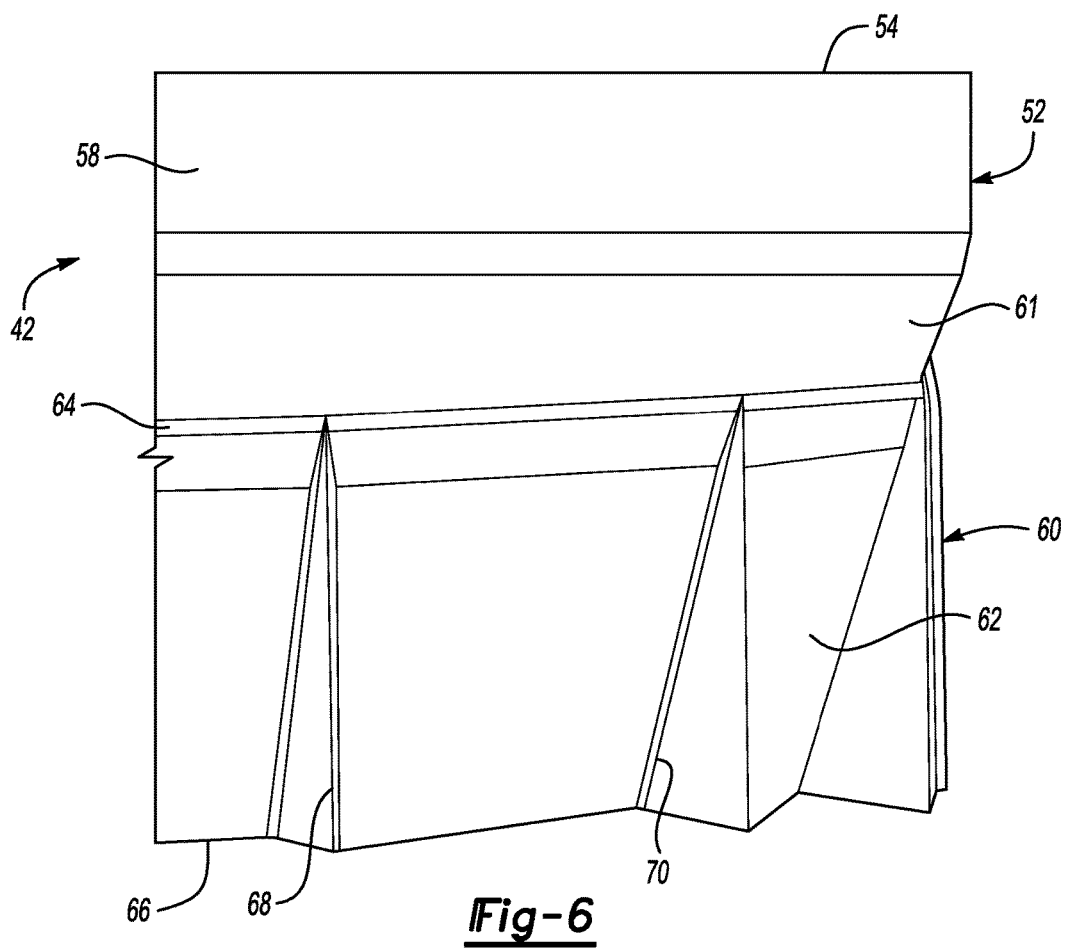
FIG. 6 is a perspective view of a first geometric configuration of the plurality of flexible pleats on the forward wall of the air dam housing.
Figure 7:
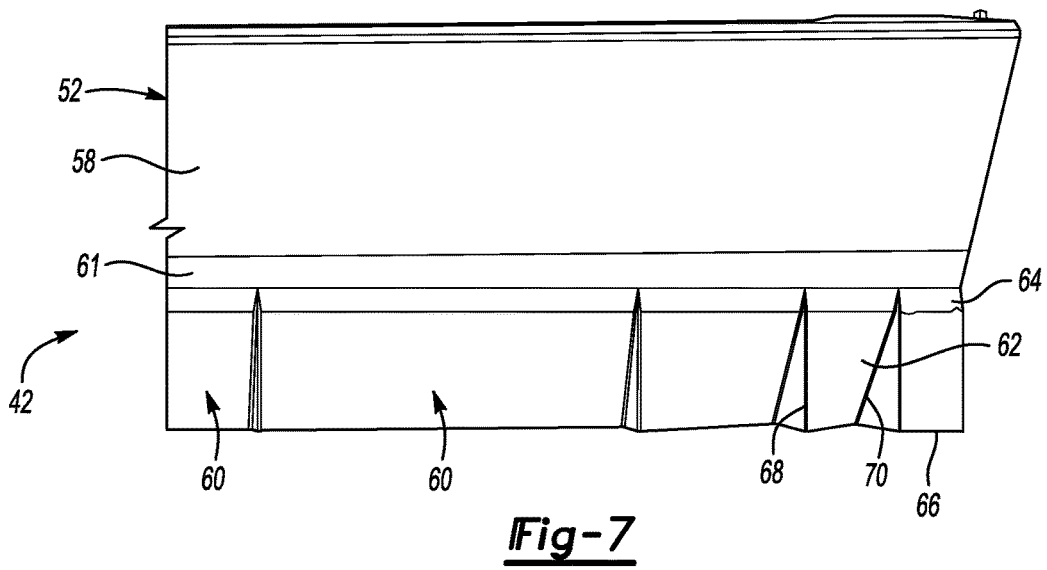
FIG. 7 is a perspective view of a second geometric configuration of the plurality of flexible pleats on the forward wall of the air dam housing of the air dam assembly of the present disclosure.

Referring additionally now to FIGS. 6 and 7, the plurality of flexible pleats 60 of the air dam assembly 42 are illustrated and described in greater detail. Air dam assembly 42 includes a plurality of vertically arranged flexible pleats 60 that may be disposed on the air dam housing such that pleats 60 extend toward the bottom wall 56 of the air dam housing 52. The air dam housing 52 is disposed and extends between the left side 20 and right side 22 of the vehicle body 14 as shown in FIG. 1. It is contemplated that the plurality of flexible pleats 60 are disposed on portions of the forward wall 58 of the air dam housing 52 proximate the left side 20 and right side 22 of the vehicle body 14. However, it is understood that the plurality of flexible pleats may be positioned in a variety of locations on the air dam housing or across the forward wall of entire air dam housing to accomplish the objectives of the disclosure.

The plurality of flexible pleats 60 each include a pleat body 62 defined by and between an upper portion 64 and an opposing lower portion 66 of the body 62. Each of the pleat bodies 62 define a plurality of leading edges 68 and opposing trailing edges 70 extending between the upper portion 64 and lower portion 66 of the pleat body 62. It is contemplated that the leading edge 68 of the pleat body 62 may protrude generally forward from a planar surface of the forward wall 58 of the air dam housing 52, whereas the opposing trailing edge 70 of the pleat body 62 may be disposed on the planar surface of the forward wall 58 of the air dam housing 52.

It is contemplated that the geometry of the pleat body 62 may cooperate with the air dam housing to generally stiffen the forward wall 58 and an opposing rearward wall (not shown) of the air dam housing 52 against torsion or movement that might be induced by airflow generated by the ambient air generated by vehicle travel. Additionally, the arrangement of the plurality of flexible pleats 60 on the air dam housing 52 of the air dam assembly 42 may also resist flexure or bending of the air dam assembly 42.

In one embodiment of the disclosure illustrated in FIG. 6, the upper portion 64 of the pleat body 62 may protrude generally forward of the planar surface of the forward wall 58 of air dam housing 52. Pleat body 62 may include a generally planar surface that extends between the upper portion 64 and lower portion 66 of the pleat body 62. Alternatively as shown in FIG. 7, the pleat body 62 may include a curved surface or geometry extending inward from the protruding upper portion 64 to the lower portion 66 relative to the air dam housing 52 as the pleat body 62 extends between the upper portion 64 and lower portion 66 of the pleat body 62.

The geometry of pleat body as described above may reduce the force and stress against the plurality of flexible pleats 60 and air dam assembly 42 by allowing the plurality of flexible pleats 60 to bend or flex if encountering a road surface or adjacent the road surface. Additionally, the geometry of the plurality of flexible pleats 60 may improve the aerodynamic properties of the air dam assembly 42 by stiffening as the vehicle travels and the plurality of flexible pleats 60 are subjected to torsion to define an aerodynamic path of airflow across the air dam assembly 42.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body having a first end and a second end;
   a hood configured to cover a portion of the first end of the body to thereby define an under-hood compartment; and
   an air dam assembly disposed at the first end of the body and configured to control an airflow between the body and a road surface from outside the vehicle to the under-hood compartment, the air dam assembly including:
      an air dam housing having a top wall and a bottom wall defining a forward wall and an opposing rearward wall therebetween, and
      a plurality of flexible pleats disposed on the forward wall of the air dam housing, the plurality of flexible pleats including a plurality of vertically arranged pleat bodies, each of the pleat bodies including
         an upper portion,
         a lower portion,
         a leading edge extending between the upper and lower portions and protruding from the forward wall of the air dam housing, and a trailing edge extending between the upper and lower portions and formed adjacent the forward wall of the air dam housing, wherein each of the plurality of pleat bodies includes a curved surface extending inward relative to the air dam housing between the upper portion and lower portion of the pleat body.

2. The vehicle of claim 1 wherein each of the pleat bodies is a planar surface extending between the upper portion and lower portion of the pleat body.

3. The vehicle of claim 1 wherein the plurality of flexible pleats are integrally formed into the air dam housing.

4. The vehicle of claim 1 wherein the plurality of flexible pleats are secured to the forward wall of the air dam housing.

5. The vehicle of claim 1 wherein the plurality of flexible pleats are disposed on the air dam housing in a vertical arrangement.

6. The vehicle of claim 1 wherein the air dam housing includes a curved surface configured to at least partially wrap around the first end of the body and to align with the vehicle body.

7. The vehicle of claim 6 wherein the air dam housing is disposed and extends between the left and right sides of the vehicle body.

8. The vehicle of claim 7 wherein the plurality of flexible pleats are disposed on portions of the forward wall of the air dam housing proximate the left and right sides of the vehicle body.

9. The vehicle of claim 1, wherein:
the under-hood compartment houses an internal combustion engine and a heat exchanger;
the engine is cooled by a fluid circulating through the heat exchanger; and
the air dam assembly directs the airflow such that the airflow is passed through the heat exchanger to modulate cooling of the fluid after the fluid is passed through the engine.

10. The vehicle of claim 1 wherein the curved surface provided in each of the plurality of pleat bodies extends inward from the protruding upper portion to the lower portion formed on the forward wall of the air dam housing and extends inward between the upper portion protruding from the forward wall of the air dam housing and the lower portion formed adjacent the forward wall of the air dam housing.

11. The vehicle of claim 1 wherein the air dam assembly further comprises one or more fins formed into the rearward wall adjacent the bottom wall of the housing, the one or more fins cooperating with the plurality of flexible pleats to provide stiffness to air dam housing.

12. A vehicle comprising:
a vehicle body having a first end and a second end;
a hood configured to cover a portion of the first end of the body to thereby define an under-hood compartment housing an internal combustion engine and a heat exchanger; and
an air dam assembly disposed at the first end of the body and configured to control an airflow between the body and a road surface from outside the vehicle to the under-hood compartment, the air dam assembly including:
an air dam housing having a curved surface configured to at least partially wrap around the first end of the body and to align with the vehicle body, the air dam housing defined by a top wall and a bottom wall defining a forward wall and an opposing rearward wall therebetween, and
a plurality of flexible pleats disposed on the forward wall of the air dam housing, the plurality of flexible pleats comprising a plurality of vertically arranged pleat bodies, each of the pleat bodies including
an upper portion,
a lower portion,
a leading edge extending between the upper and lower portions and protruding from the forward wall of the air dam housing, and
a trailing edge extending between the upper and lower portions and formed adjacent the forward wall of the air dam housing,
wherein each of the plurality of pleat bodies includes a curved surface extending inward relative to the air dam housing between the upper portion and lower portion of the pleat body, and
one or more fins formed into the rearward wall adjacent the bottom wall of the housing, the one or more fins cooperating with the plurality of flexible pleats to provide stiffness to the air dam housing,
wherein the engine is cooled by a fluid circulating through the heat exchanger and the air dam assembly directs the airflow such that the airflow is passed through the heat exchanger to modulate cooling the fluid after the fluid is passed through the engine.

13. The vehicle of claim 12 wherein each of the pleat bodies is a planar surface extending between the upper portion and lower portion of the pleat body.

14. The vehicle of claim 12 wherein the plurality of flexible pleats are integrally formed into the air dam housing.

15. The vehicle of claim 12 wherein the plurality of flexible pleats are secured to the forward wall of the air dam housing.

16. The vehicle of claim 12 wherein the curved surface provided in each of the plurality of pleat bodies extends inward from the protruding upper portion to the lower portion formed on the forward wall of the air dam housing and extends inward between the upper portion protruding from the forward wall of the air dam housing and the lower portion formed adjacent the forward wall of the air dam housing.

17. An air dam assembly for a vehicle comprising:
an air dam housing having a top wall and a bottom wall defining a forward wall and an opposing rearward wall therebetween;
a plurality of flexible pleats disposed on the forward wall of the air dam housing, the plurality of flexible pleats including a plurality of pleat bodies, each of the pleat bodies including
an upper portion,
a lower portion,
a leading edge extending between the upper and lower portions and protruding from the forward wall of the air dam housing, and
a trailing edge extending between the upper and lower portions and formed adjacent the forward wall of the air dam housing; and
one or more fins formed into the rearward wall adjacent the bottom wall of the housing, the one or more fins cooperating with the plurality of flexible pleats to provide stiffness to air dam housing.

18. The air dam assembly of claim 17 wherein the plurality of flexible pleats are integrally formed into the air dam housing.

19. The air dam assembly of claim 17 wherein the pleat body includes a curved surface extending inward relative to the air dam housing between the upper portion and lower portion, wherein the curved surface provided in each of the plurality of pleat bodies extends inward from the protruding upper portion to the lower portion formed on the forward wall of the air dam housing and extends inward between the upper portion protruding from the forward wall of the air dam housing and the lower portion formed adjacent the forward wall of the air dam housing.

* * * * *